US011151629B2

(12) United States Patent
Gopalakrishnan (10) Patent No.: US 11,151,629 B2
(45) Date of Patent: Oct. 19, 2021

(54) DETECTING ITEMS OF INTEREST WITHIN LOCAL SHOPS

(75) Inventor: Ravi Gopalakrishnan, Fremont, CA (US)

(73) Assignee: eBay Inc., San Jose, CA (US)

(*) Notice: Subject to any disclaimer, the term of this patent is extended or adjusted under 35 U.S.C. 154(b) by 0 days.

(21) Appl. No.: 13/592,147

(22) Filed: Aug. 22, 2012

(65) Prior Publication Data

US 2014/0058886 A1    Feb. 27, 2014

(51) Int. Cl.
 *G06Q 30/00* (2012.01)
 *G06Q 30/06* (2012.01)
 *G06Q 30/02* (2012.01)

(52) U.S. Cl.
 CPC ......... *G06Q 30/0631* (2013.01); *G06Q 30/02* (2013.01); *G06Q 30/0255* (2013.01); *G06Q 30/0261* (2013.01)

(58) Field of Classification Search
 CPC ........... G06Q 30/0261; G06Q 30/0255; G06Q 30/0631
 USPC ...................................................... 705/26.8
 See application file for complete search history.

(56) References Cited

U.S. PATENT DOCUMENTS

| | | | | |
|---|---|---|---|---|
| 6,587,835 | B1* | 7/2003 | Treyz | G06Q 20/12 705/14.64 |
| 6,853,982 | B2* | 2/2005 | Smith et al. | 705/26.7 |
| 7,231,357 | B1* | 6/2007 | Shanman et al. | 705/14.23 |
| 8,160,929 | B1 | 4/2012 | Park et al. | |
| 8,504,089 | B2* | 8/2013 | Stewart | 455/518 |
| 8,600,835 | B1* | 12/2013 | Lueck | G06Q 30/0283 705/26.8 |
| 8,606,655 | B2* | 12/2013 | Allen et al. | 705/26.8 |
| 8,612,306 | B1* | 12/2013 | Mukherjee | G06Q 30/0627 705/26.5 |
| 2002/0023010 | A1 | 2/2002 | Rittmaster et al. | |

(Continued)

FOREIGN PATENT DOCUMENTS

| | | |
|---|---|---|
| CN | 1333513 A | 1/2002 |
| CN | 1972228 A | 5/2007 |

(Continued)

OTHER PUBLICATIONS

Pattarawan Prasarnphanich, Mark L. Gillenson. "The hybrid clicks and bricks business model." Nov. 12, 2003. (Year: 2003).*

(Continued)

*Primary Examiner* — Abby J Flynn
(74) *Attorney, Agent, or Firm* — Schwegman Lundberg & Woessner, P.A (57) ABSTRACT

Systems and methods disclosed herein may operate to receive, at a user device corresponding to a user of a web service, information identifying an item, based on the user device being located within a specified range of distance from the item; access a list of items including at least one item of interest to the user, with each item of interest within the list of items having been previously identified by the user at the web service; compare the information against the list of items; identify the item as being an item of interest to the user based at least in part on the information at least partially identifying the at least one item of interest within the list of items; and signal the user device to present a notification alerting the user that the item at least partially matches a previously identified item of interest.

10 Claims, 7 Drawing Sheets

(56) References Cited

U.S. PATENT DOCUMENTS

| | | | |
|---|---|---|---|
| 2007/0061332 A1* | 3/2007 | Ramer | G06Q 30/0241 |
| 2007/0095903 A1 | 5/2007 | Suenbuel | |
| 2007/0100802 A1* | 5/2007 | Celik | G06Q 10/087 |
| 2007/0123221 A1* | 5/2007 | Mazenier et al. | 455/412.2 |
| 2007/0191026 A1* | 8/2007 | Teplitsky | G01C 21/20 |
| | | | 455/456.3 |
| 2008/0059297 A1* | 3/2008 | Vallier | G06Q 30/02 |
| | | | 705/14.27 |
| 2008/0245863 A1* | 10/2008 | Buchheit | G06Q 30/06 |
| | | | 235/383 |
| 2009/0012704 A1 | 1/2009 | Franco et al. | |
| 2009/0187466 A1 | 7/2009 | Carter et al. | |
| 2009/0198666 A1* | 8/2009 | Winston | G06Q 50/01 |
| 2010/0082455 A1 | 4/2010 | Rosenblatt et al. | |
| 2011/0238474 A1* | 9/2011 | Carr | G06Q 30/0639 |
| | | | 705/14.23 |
| 2011/0276385 A1* | 11/2011 | Keller | 705/14.38 |
| 2012/0059735 A1* | 3/2012 | Su et al. | 705/26.7 |
| 2012/0143720 A1* | 6/2012 | Moser | G06Q 30/02 |
| | | | 705/26.8 |
| 2012/0173351 A1 | 7/2012 | Hanson et al. | |
| 2012/0205433 A1 | 8/2012 | Dudek et al. | |
| 2012/0239504 A1* | 9/2012 | Curlander | G06Q 30/02 |
| | | | 705/14.66 |
| 2012/0277991 A1* | 11/2012 | Wagner et al. | 701/410 |
| 2012/0323658 A1* | 12/2012 | Zhou et al. | 705/14.23 |
| 2013/0190016 A1* | 7/2013 | Krishnakumar | H04W 4/029 |
| | | | 455/456.3 |
| 2013/0210461 A1* | 8/2013 | Moldavsky et al. | 455/456.3 |
| 2013/0317944 A1* | 11/2013 | Huang | G01S 5/0252 |
| | | | 705/26.61 |
| 2014/0188658 A1* | 7/2014 | Li et al. | 705/26.8 |
| 2015/0127748 A1* | 5/2015 | Buryak | G06F 16/9535 |
| | | | 709/206 |

FOREIGN PATENT DOCUMENTS

| | | |
|---|---|---|
| CN | 102402772 A | 4/2012 |
| CN | 104737191 A | 6/2015 |
| JP | 2002175465 A | 6/2002 |
| JP | 2003-528398 A | 9/2003 |
| KR | 20070004308 A | 1/2007 |
| KR | 20090078321 A | 7/2009 |
| KR | 20100022891 A | 3/2010 |
| KR | 20110083831 A | 7/2011 |
| WO | WO-2014031898 A2 | 2/2014 |
| WO | WO-2014031898 A3 | 2/2014 |

OTHER PUBLICATIONS

Xiaobin Fu, Jay Sudzik, Kristian J. Hammond. "Mining Navigation History for Recommendation." Infolab, Northwestern University. Jan. 9, 2000. (Year: 2000).*

Lindsay Carpen. "Brick-and-mortar retailers go cross-channel for a 360-degree view." Feb. 10, 2011 (Year: 2011).*

"International Application Serial No. PCT/US2013/056275, International Search Report dated Mar. 20, 2014", 3 pgs.

"International Application Serial No. PCT/US2013/056275, Written Opinion dated Mar. 20, 2014", 7 pgs.

"International Application Serial No. PCT/US2013/056275, International Preliminary Report on Patentability dated Mar. 5, 2015", 9 pgs.

"Canadian Application Serial No. 2,881,716, Response filed Oct. 27, 2016 to Office Action dated May 2, 2016", 13 pgs.

"Australian Application Serial No. 2013305688, First Examiner Report dated Nov. 5, 2015", 3 pgs.

"Australian Application Serial No. 2013305688, Response filed Mar. 23, 2016 to First Examiner Report dated Nov. 5, 2015", 23 pgs.

"Canadian Application Serial No. 2,881,716, Office Action dated May 2, 2016", 4 pgs.

"Korean Application Serial No. 2015-7007071, Office Action dated Oct. 20, 2015", 18 pgs.

"Korean Application Serial No. 2015-7007071, Response filed Jan. 20, 2016 to Office Action dated Oct. 20, 2015", 36 pgs.

"Canadian Application Serial No. 2,881,716, Office Action dated Feb. 23, 2017", 5 pgs.

"Korean Application Serial No. 2016-7023954, Office Action dated Nov. 10, 2016", w/ English Translation, 6 pgs.

"Korean Application Serial No. 2016-7023954, Response filed Feb. 10, 2017 to Office Action dated Nov. 10, 2016", (English Translation of Claims), 17 pgs.

"Chinese Application Serial No. 201380054386.8, Office Action dated Apr. 14, 2017", W/ English Translation, 26 pgs.

First Examination Report received for Australian Patent Application No. 2016213863, dated Aug. 18, 2017, 4 pages.

Office Action received for Canadian Patent Application No. 2,881,716, dated Jan. 9, 2018, 5 pages.

Response to Office Action filed on Aug. 3, 2017 for Canadian Patent Application No. 2,881,716, dated Feb. 23, 2017, 12 pages.

Response to Office Action filed on Aug. 28, 2017 for Chinese Patent Application No. 201380054386.8, dated Apr. 14, 2017, 12 pages (Including English Claims).

Notice of Preliminary Rejection received for Korean Patent Application No. 10-2016-7023954, dated Aug. 31, 2017, 5 pages.

Response to Notice of Preliminary Rejection filed on Oct. 31, 2017 for Korean Patent Application No. 10-2016-7023954, dated Aug. 31, 2017, 9 pages (Including English Claims).

Response to Office Action filed on May 11, 2018 for Chinese Patent Application No. 201380054386.8, dated Feb. 27, 2018, 14 pages (10 pages of Official Copy and 4 pages of English Translation).

Notice of Preliminary Rejection received for Korean Patent Application No. 10-2016-7023954, dated Mar. 30, 2018, 7 pages (3 pages of English Translation and 4 pages of Official Copy).

Office Action received for Chinese Patent Application No. 201380054386.8, dated Feb. 27, 2018, 25 pages (15 pages of English Translation and 10 pages of Official Copy).

Office Action received for Korean Patent Application No. 10-2016-7023954, dated Aug. 31, 2018, 9 pages (w/English Claims).

Response to Office Action filed on May 30, 2018, for Korean Patent Application No. 10-2016-7023954, dated Mar. 30, 2018, 18 pages (w/English Claims).

Response to Office Action filed on Jul. 9, 2018, for Canada Patent Application No. 2,881,716, dated Jan. 9, 2018, 14 pages.

Decision of Rejection Received for Chinese Patent Application No. 201380054386.8, dated Aug. 24, 2018, 15 pages (w/English Claims).

Response to Office Action filed on Oct. 30, 2018 for Korean Patent Application No. 10-2016-7023954, dated Aug. 31, 2018, 17 pages (9 pages of Official Copy and 8 pages of English Translation).

Office Action received for Canada Patent Application No. 2,881,716, dated Dec. 13, 2018, 5 pages.

Final Office Action received for Korean Patent Application No. 10-2016-7023954, dated May 1, 2019, 8 pages (4 pages of English Translation and 4 pages of Official copy).

Response to Final Office Action filed on Mar. 29, 2019, for Korean Patent Application No. 10-2016-7023954, dated Jan. 29, 2019, 24 pages (13 pages of Official Copy and 11 pages of English Translation).

Final Office Action received for Korean Patent Application No. 10-2016-7023954, dated Jan. 29, 2019, 7 pages (4 pages of English Translation and 3 pages of Official Copy).

Response to Office Action filed on Mar. 7, 2019 for Canadian Patent Application No. 2,881,716 dated Dec. 13, 2018, 7 pages.

Response to Decision of Rejection filed on Dec. 7, 2018 for Chinese Patent Application No. 201380054386.8, dated Aug. 24, 2018, 11 pages (7 pages of Official Copy and 4 pages of English Claims).

Appeal Brief filed on Jul. 1, 2019, for Korean Patent Application No. 10-2016-7023954, 26 pages (16 pages of Official Copy and 10 pages of English Translation).

Reexamination Notification received for Chinese Patent Application No. 201380054386.8, dated Oct. 12, 2019, 22 pages (12 page official copy and 10 pages English machine translation).

* cited by examiner

DETECTING ITEMS OF INTEREST WITHIN LOCAL SHOPS

TECHNICAL FIELD

The present application relates generally to the field of computer technology and, in various embodiments, to a system, apparatus and method of detecting an item of interest using a portable user device, such as a smartphone or tablet computer.

BACKGROUND

Various types of user devices, such as smartphones and tablet computers, are now used on a daily basis for business transactions of items, goods or services. In various situations, a user may search for an item (e.g., goods or services) of interest at an online store, such as an eBay.com, Target.com, Amazon.com, AMC.com and so on, and then decide to buy the item at an (physical) offline store (e.g., a shopping mall, resort, museum, restaurant, theater, etc.), which may be affiliated with the online store rather than at the online store itself. Various reasons may exist to motivate the user to search the item of interest at the online store and to shop (e.g., buy, rent, lease, etc.) for it at the (physical) offline store. For example, the user may need the item in a rush so that he cannot wait for delivery, or the offline store may provide a better deal (e.g., a larger discount) for the item than the online store does, such as for seasonal clearance or branch close-out and so on.

BRIEF DESCRIPTION OF THE DRAWINGS

Some embodiments are illustrated by way of example and not by way of limitation, in the figures of the accompanying drawings.

DETAILED DESCRIPTION

Example methods, apparatuses, and systems to detect an item of interest within or near a physical store using a user device of a user are disclosed herein. In the following description, for purposes of explanation, numerous specific details are set forth in order to provide a thorough understanding of the present disclosure. It may be evident, however, to one skilled in the art, that the subject matter of the present disclosure may be practiced without these specific details.

Conventionally, in a scenario such as an online search and offline shopping, for example, when the user enters the vicinity of the (physical) offline store (e.g., the shopping mall), the user may need to move around within or near a facility of the (physical) offline store, or ask a staff member thereof, to find the item of interest for which he searched at the online store. This may become frustrating for various reasons, such as the facility of the offline store being large, understaffed, or staffed with unkind and/or ineffective (e.g., new) members and so on. Moreover, in some cases, the user may forget about the item of interest that has been searched online when he actually stops by the offline store for other reasons (e.g., to buy a different item) or incidentally drives (or walks) by the offline store on the way to work or home. This may happen, for example, when he decided not to buy, or did not make a final decision whether to buy, the item of interest during the time of the online search (e.g., a couple of days, weeks, or month before his actual visit to the offline store). Sometimes, in addition to and/or alternatively, the user does not know that the physical store he visits or drives (or walks) by provides an item identical or similar to the item of interest.

Under existing technologies, the user who wishes to make a transaction for the previously searched item of interest at the physical store may need to furnish himself with the information for the item of interest (e.g., remember or print out and carry a corresponding web page for the item of interest) to make the wanted transaction at the right time (e.g., when he visits, or gets close to, the physical store). This may be at least cumbersome and time consuming. Moreover, it may be impractical, if not impossible, in some situations, such as described above when the user decides to buy the item of interest only at a substantially later time than the time of the online search, or when the physical shop providing the item of interest is located comparatively far from the user. Accordingly, under the existing technologies, the user may not utilize the incident of visiting or driving by the physical shop and may have to visit it again to make the wanted transaction for the item of interest.

The above-described problems and other problems of the existing technologies may be solved by using cookie-type information, among other things, that may be stored in the user device when the item of interest is searched online. For example, when the user browses for a product or service at a network-based online transaction platform (e.g., eBay) using his user device (e.g., a smartphone or tablet computer or any other portable device), a cookie file (e.g., a personal data store (PDS) cookie) may be generated and tied to the user or the user device by the network-based online transaction platform (e.g., eBay, amazon.com, or some similar online marketplace).

When a relationship between the cookie file and the user (or the user device) is established, the network-based transaction platform may identify the user (or the user device) using information in the cookie file. The cookie file may contain various information about the user (e.g., login identification and password) or the user device (e.g., the device identification and location information), and the product or service being browsed. The information to be stored in the cookie file with respect to the product or service being browsed may comprise at least a portion of the product or service information provided by the network-based transaction platform at the time of the browsing, such as a name, price, description, unique identification code, discount information, customer reviews, related item information, and so forth. The unique identification of the product or service being browsed may be provided in a form that can be read or identified via an electronic code reader, such as a quick response (QR) code reader, bar code reader, radio frequency (RF) identification (RFID) reader or any other suitable code reader.

Sometime later on, when the user visits or gets close to (e.g., drives or walks by) a physical facility providing the same type of products or services (e.g., a book store, sport equipment store, electronic goods store, golf course, food court, theater, amusement park and so on), the information stored in the user device, for example, in the form of the cookie file, may be used to identify, from within or near the physical facility, an item that is identical, similar or related to the product or service that has been previously browsed online at the network-based transaction platform.

In various embodiments, in addition to and/or as an alternative to the cookie-type information, other type of information, such as a wish list or a shopping cart may be generated and tied to the user device for the browsed items. For example, in one embodiment, at least some of the other type of information (e.g., the wish list or the shopping cart) may be imported from a corresponding network-based online transaction platform where the user browsed items. In another embodiment, at least some of the other type of information may be generated as a function of an application (e.g., an item detection module 419 of FIG. 4 as described below) executing on the user device.

Figure 1:
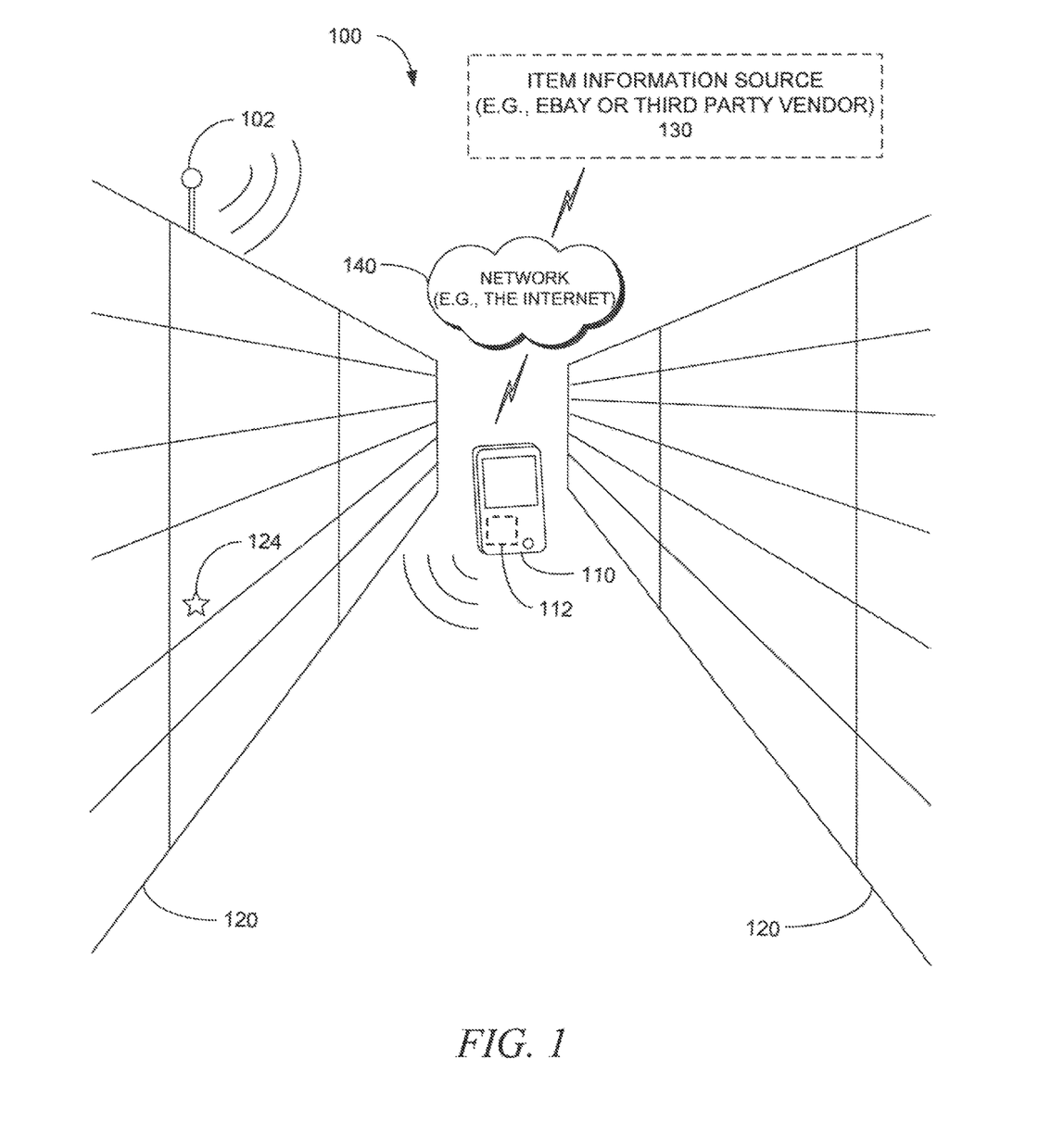
FIG. 1 is a schematic diagram illustrating a physical facility environment of a local merchant, according to various embodiments.

For example, referring to FIG. 1, in various embodiments, a user possessing a user device 110 may approach near (e.g., a nearby road, parking lot or an entrance of) a shopping mall 100, or enter an area inside the shopping mall 100, such as an aisle within a specified range (e.g., 5, 30 or 100 feet) from corresponding one or more of shelves 120. Based on the user device 110 approaching or entering the shopping mall 100, the user device 110 may receive information identifying and describing items (e.g., goods or services) provided by the shopping mall 100. The information identifying and describing the items may be transmitted from an on-site information transceiver 102 installed in the vicinity of the corresponding one or more of the shelves 120 (for example, in the form of RF communication) or from an item information source 130 external to the shopping mall 100 (for example, in the form of wireless network communication via a network 140 (e.g., the Internet)). The item information source 130 may comprise a network-based transaction platform, such as eBay or Amazon, or a third-party vendor affiliated with the (physical) shopping mall or big box store, such as Target or Best Buy. In various embodiments, the shopping mall 100 may be any physical store that shares catalogs or inventory information with the network-based transaction platform.

The received information identifying and describing the items provided by the shopping mall 100 may be compared with information in a (e.g., PDS) cookie previously stored in memory 112 of the user device 110 at the time the user browsed one or more items of interests at a web site run by the item information source 130. When at least a partial match is found between the information received at a location near or within the shopping mall 100 and the information stored in the (e.g., PDS) cookie in the user device 110, the user device 110 may transmit (e.g., burst) a notification, such as a beep, alarm, musical note or vibration, alerting the user of an existence of an item 124 that is identical, similar or related to the previously browsed item of interest within or near the physical facility of the shopping mall 100.

Further information with respect to the matching item 124 may be presented via the user device 110 (e.g., on a display thereof), providing the user with more information helpful to make a transaction decision (e.g., buying or not buying) for the item 124. The additionally display information may include comparison pricing, information indicating where the user originally viewed the item, and additional product or service details, among other things. This allows the user to maximize the (incidental or intended) visit to the (physical) shopping mall 100, reducing the time needed to find a specific location within the shopping mall 100 where the item 124 matching one or more item of interest to the user is located, or the need to visit the shopping mall 100 again for forgotten items. This in turn may enhance user experiences in using the user device, for example, as an offline shopping aid.

Figure 2:
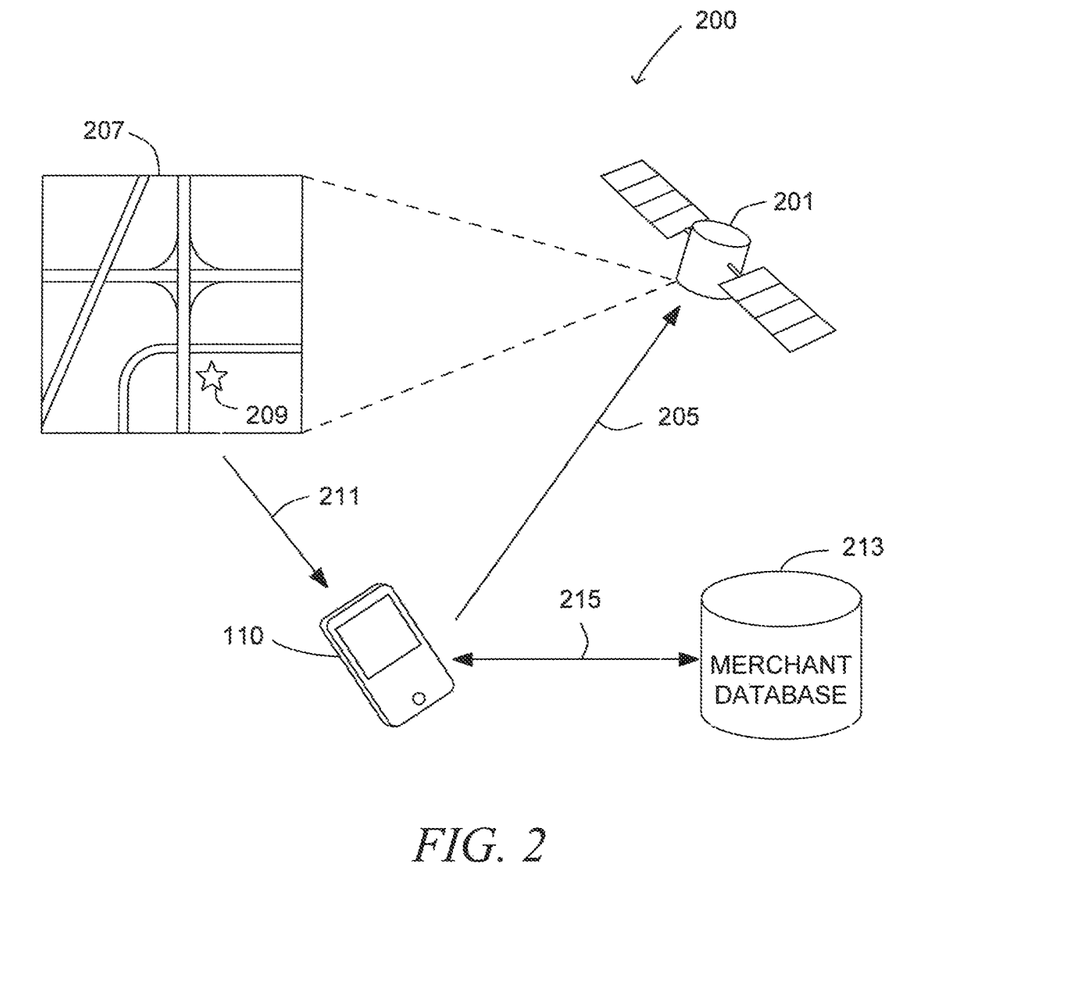
FIG. 2 is a schematic diagram illustrating a global positioning system (locating system, according to various embodiments.

FIG. 2 shows a simplified diagram of a GPS locating system 200 to determine a location of a nearby physical store (e.g., the shopping mall 100) providing an item that matches a previously browsed item, according to various embodiments. Referring to FIG. 2, in addition to the user device 110 (e.g., a smartphone), the GPS locating system 200 is shown to include a GPS satellite 201 and a merchant database 213. The merchant database 213 may be an item or store information database provided by the network-based transaction facility (e.g., eBay, Amazon, Target and so on) described with respect to FIG. 1, a local database provided by an area chamber of commerce, or a store database maintained by a third-party publisher, such as Website Yellow Pages®, maintained by Platinum Advertising LLC of Appleton, Wis., USA. In another embodiment, for example, the merchant database 213 may be maintained by a real-time inventory information provider, such as Milo (milo.com) from eBay of San Jose, Calif., USA.

In various embodiments, the user of the user device 110 may be automatically directed to, or given the option of being directed to, a local merchant to view or purchase the selected items of interest. The GPS locating system 200 may be used to make a determination of the location of the physical facility of the local merchant. For example, in one embodiment, the GPS satellite 201 may track the user device 110 by an integrated circuit (e.g., a GPS receiver) embedded therein (e.g., one embedded into most cellular phones for the past several years). By means known independently in the art, a signal may be received by the GPS satellite 201 from the user device 110, as indicated by an arrowed line 205. (The signal may be received indirectly through a cellular phone tower.) The GPS satellite 201 may then determine the location of the user device 110, for example, as indicated by a position 209 marked as a star symbol ("☆") on a virtual map 207. Within several meters of accuracy, the position 209 of the user device 110 may be indicated on the virtual map 207 and transmitted or otherwise transferred to the user device 110 through a return transmission path 211. The user device 110 may then transmit the position 209 to the merchant database 213 through a bi-directional communication channel 215. A determination of nearest local merchants may then be determined (by, for example, the user device 110, the merchant database 213 or a combination thereof).

In other embodiments, a determination of the position 209 of the user device 110 may be made by other means. For example, if the user of the user device 110 is located within the physical facility of the local merchant (e.g., the shopping mall 100), various networks within the physical facility may be accessed to determine the position 209 of the user device 110. More information regarding such embodiments is provided below with respect to FIG. 3.

Figure 3:
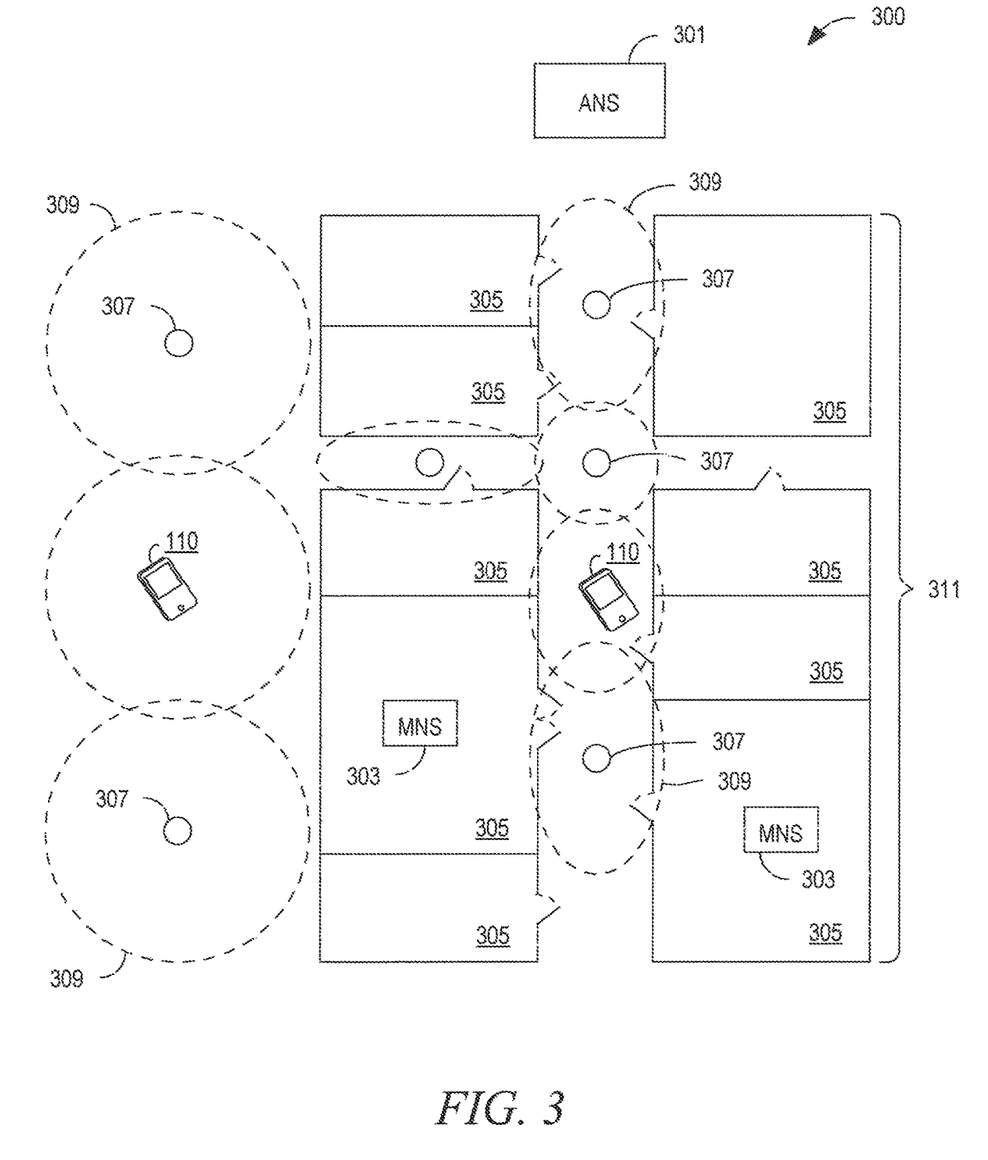
FIG. 3 is a schematic diagram illustrating a close-range positional location system operating via a wireless communications network to detect an item of interest within or near a physical facility of a local merchant, according to various embodiments.

FIG. 3 shows a schematic diagram illustrating a close-range positional location system 300 operating via a wireless communications network (e.g., the network 140 in FIG. 1) to detect a location of the user device 110 of FIG. 1 within or near a physical facility (e.g., the shopping mall 100, a stadium, an entertainment arena, a theater, etc.) of one or more local merchants or otherwise localized geographical area, according to various embodiments. The close-range positional location system 300 may be used in conjunction with the GPS locating system 200 of FIG. 2, or, optionally, operate separately, to identify a position of a user device 110. The close-range positional location system 300 may include an area networking system (ANS) 301, one or more merchant networking systems (MNS) 303, a plurality of merchant stores 305 within the facility 311, and a plurality of network access points 307. The ANS 301 and the MNS 303 may comprise, for example, any of various types of wireless local area networks (WLANs). The ANS 301 and the MNS 303 may be used in conjunction with one another or separately to determine a position of the user device 110 within the facility 311. The network access points 307 may facilitate wireless communication between the ANS 301 and the MNS 303. Connections between the ANS 301 and the MNS 303 may be wireless or hardwired via, for example, an Ethernet connection. Each of the network access points 307 may have a limited area of coverage, as shown by an associated communication range 309.

In an example embodiment, when a user enters the facility 311 with the user device 110, the ANS 301 may determine a location data of the electronic device. The ANS 301 or the MNS 303 may determine the location (e.g., relative location) of the user device 113 by making a determination through which of the network access points 307 the user device 110 is communicating or accessible by the ANS 301 or the MNS 303. Each of the network access points 307 may have a separate network address. Any data received from the user device 110 by either the ANS 301 or the MNS 303 may be determined by the ANS 301 or the MNS 303 to have come from a particular one of the network access points 307. Consequently, by determining which of network access points 307 has received data from the user device 110, and the associated communication range 309 for that particular access point, either the ANS 301, the MNS 303, or a combination thereof may determine the approximate position of the user device 110 within or near the facility 311.

Additionally, as a progressive sequence of the network access points 307 receives data from the user device 110, either the ANS 301 or the MNS 303 or a combination thereof may determine a plurality of locations for the user device 110 and use the locations to find the nearest local merchant associated with a selected item of interest and/or a specific (e.g., shelf) location for the selected item of interest within the physical store (e.g., the shopping mall 100) of the nearest local merchant, for example, as discussed above with respect to FIGS. 1-2. The ANS 301 and the MNS 303 may maintain, separately or collectively, a database (e.g., the merchant database 213), discussed above, pertaining to information and merchants associated with the selected item of interest. In various embodiments, location information determined by either the ANS 301 or the MNS 303 or a combination thereof may also be coupled with the GPS determination discussed above with reference to FIG. 9.

Figure 4:
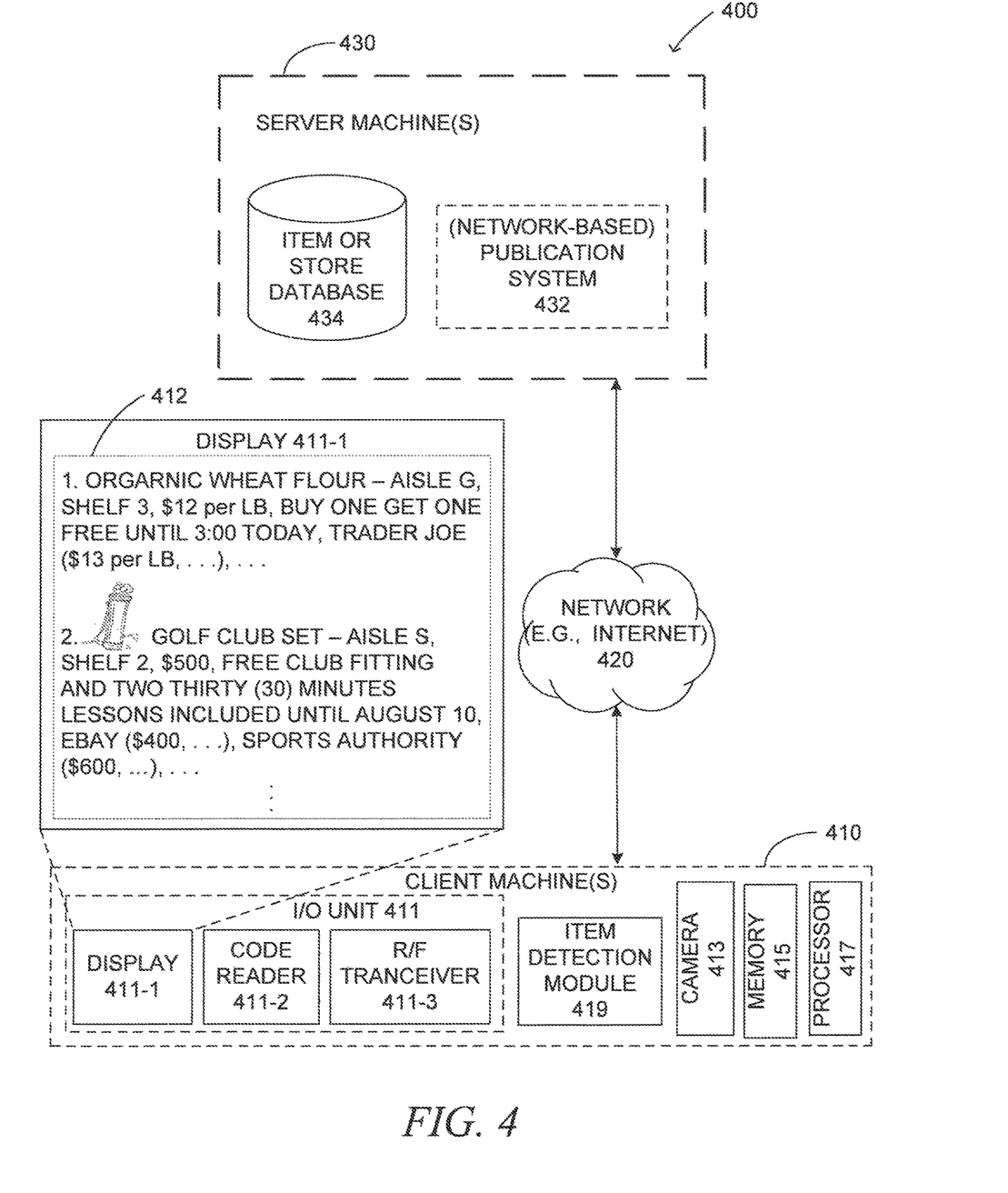
FIG. 4 is a block diagram illustrating a system in a network environment for detecting an item of interest, according to various embodiments.

FIG. 4 shows a block diagram illustrating a system 400 in a network environment for detecting an item of interest within or near a physical facility of a local merchant, according to various embodiments. The system 400 may include one or more server machines 430 connected through a network (e.g., the Internet) 420 to one or more client machines 410. In various embodiments, for example, each of the one or more client machines 410 may comprise a user device (e.g., the user device 110), such as a personal computer (PC), notebook, netbook, tablet PC, server, cell phone (e.g., smartphone), personal digital assistant (PDA), portable television (TV), set top box, and the like.

The server machines 430 may comprise a network-based publication system 432 (e.g., the network-based transaction platform, such as eBay or Amazon, described with respect to FIG. 1) and an item or store database 434 (e.g., the merchant database 213 in FIG. 2). In various embodiments, the network-based publication system 432 may provide one or more marketplace applications, payment applications, and other resources. The marketplace applications may provide a number of marketplace functions and services to users that access the marketplace. The payment applications, likewise, may provide a number of payment services and functions to users. The network-based publication system 432 may display various items listed thereon.

However, the embodiments discussed in this specification are not limited to a specific online platform, such as the network-based transaction platform. In other embodiments, other web service platforms, such as social networking websites, news aggregating websites, web portals, network-based advertising platforms, or any other system that provides web services to users, may be employed. Furthermore, more than one platform may be supported by the network-based publication system 432, and each platform may reside on a separate server machine 430 from the network-based publication system 432.

The client machine 410 may host an input/output (I/O) unit 411, a camera 413, memory 415, a processor 417 and an item detection module 419. The I/O unit 411 may comprise a display 411-1 (e.g., a touch screen) to present contents 412 (e.g., information for one or more items of interest) thereon, a code reader 411-2 (e.g., a QR code reader or a bar code reader) to read a QR code or bar code, and an R/F transceiver 411-3 to receive and transmit an R/F signal from or to, for example, a nearby R/F transceiver (e.g., the on-site information transceiver 102 in FIG. 1). For example, in one embodiment, the camera 413 may be used to capture an image of the QR or bar code and provide the captured information to the code reader 411-2.

Figure 5:
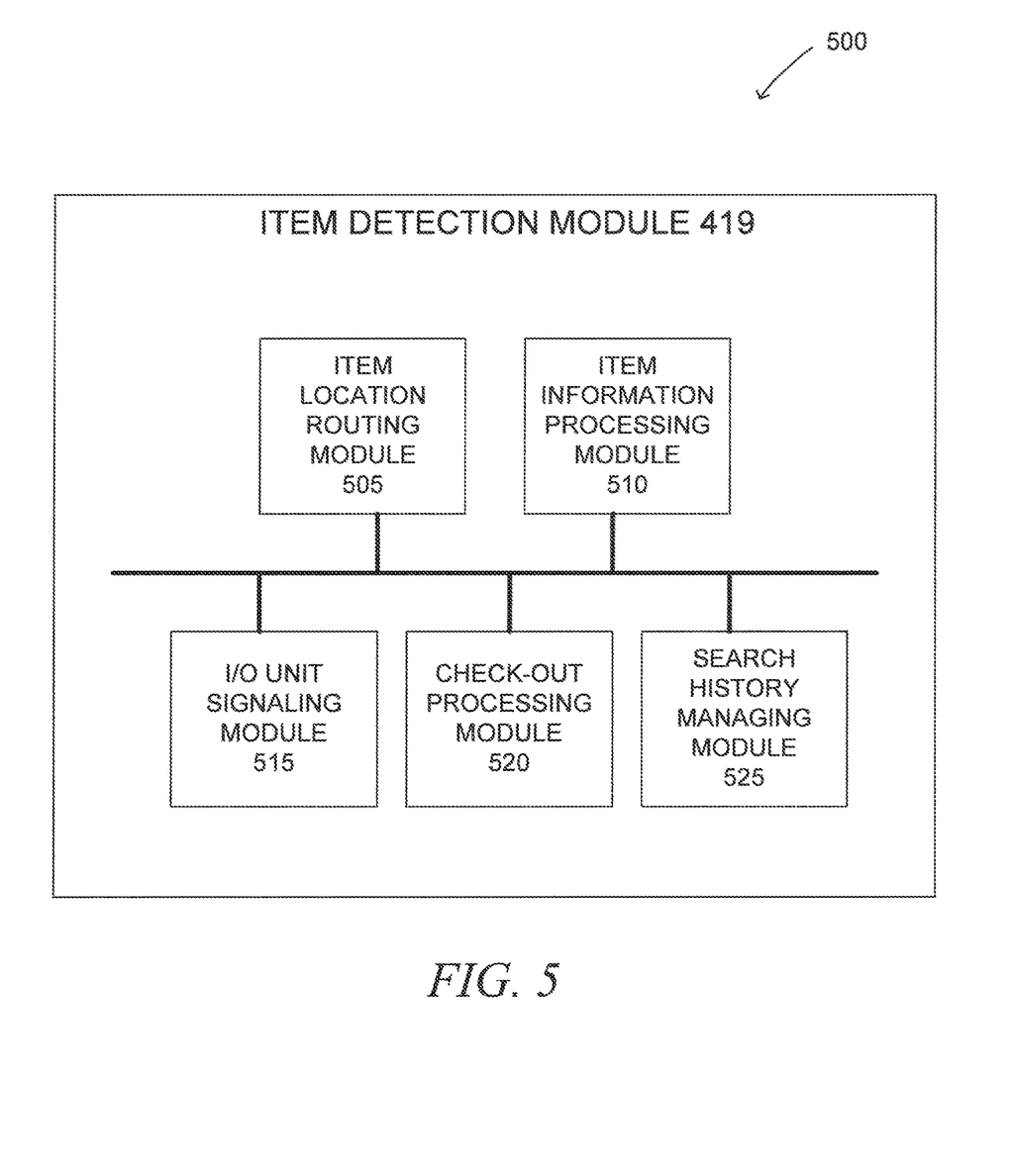
FIG. 5 is a schematic diagram illustrating a user interface of a user device for detecting an item of interest, according to various embodiments.

In various embodiments, the item detection module 419 may comprise a web browser or a gadget application that operates in a background of the computing environment of the client machine 410 or a combination thereof. The client machine 410 may be configured to permit its user to access the various applications, resources, and capabilities of the web services, for example, provided by the network-based publication system 432 via the item detection module 419. For example, in one embodiment, as shown in FIG. 5, the item detection module 419 may comprises an item location routing module 505, an item information processing module 510, an I/O unit signaling module 515, a check-out processing module 520 and a search history managing module 525. More information regarding the functions of the item detection module 419 and the component modules 505-525 thereof is provided below with respect to FIG. 6.

It is noted that while FIG. 4 illustrates the client machine 410 and the server machine 430 in client-server architecture, other embodiments are not limited to this architecture, and may equally find applications in a distributed, peer-to-peer, or standalone architectures.

In various embodiments, an apparatus (e.g., the client machine 410) may comprise: an input/output (I/O) unit (e.g., the I/O unit 411 including the display 411-1, code reader 411-2, R/F transceiver 411-3, and other network interfaces (not shown in FIG. 4), such as a wireless communication interface) to receive and present information; and one or more processors (e.g., the processor 417) to execute an item detection module (e.g., the item detection module 419), with the item detection module configured to: receive, via the I/O unit, information identifying an item, based on the apparatus being located within a specified range of distance from the item; access a list of items, the list of items including at least one item of interest to the user, each item of interest within the list of items previously identified by the user at a web service; compare the information against the list of items; identify the item as being an item of interest to the user based at least in part on the information at least partially identifying the at least one item of interest within the list of items; and signal the I/O unit to present a notification alerting the user that the item at least partially matches a previously identified item of interest.

In various embodiments, the item detection module may provide the user with an option to disable the function of presenting the alarm notification via the user device either selectively (e.g., only for certain items, such as underwear or adult toy) or completely (e.g., for any items, for example, for at least a certain time period specified by the user), for example, due to privacy concerns. This may prevent unwanted annoyance or embarrassment in using the user device.

In various embodiments, each of the at least one item of interest previously identified (e.g., browsed, searched, or added to a wish list or a shopping cart, among other things) at the web service (e.g., the network-based publication system 432) may be stored in the memory 415 in the form of a (e.g., PDS) cookie file, for example, as a function of the search history managing module 525.

In various embodiments, the I/O unit (e.g., the I/O unit 411) may comprise: at least one of an antenna, a barcode reader, a QR code reader, or an RFID (Radio Frequency Identification) transceiver.

In various embodiments, the apparatus may further comprise: memory to store at least one internet cookie including the list of items, with each item of interest within the list of items provided by the web service upon a listing of a corresponding item of interest being browsed via the web service.

In various embodiments, the I/O unit may be configured to beep, vibrate or light up in response to the signal from the item detection module (e.g., the item detection module 419).

In various embodiments, the item detection module (e.g., the item detection module 419) may be configured to: present, via the I/O unit (e.g., the display 411-1), information describing the item. In one embodiment, for example, the information describing the item identified as at least partially matching the previously identified item of interest may include at least one of a title, price, sale period for the item, or a web site where the previously identified item of interest was identified (e.g., browsed or searched).

In various embodiments, the item detection module (e.g., the item detection module 419) may be further configured to: receive location specific information associated with the item; and present, via the I/O unit, the location specific information. In one embodiment, for example, the location specific information may comprise shelf location information where the item is stocked.

In various embodiments, the item detection module (e.g., the item detection module 419) may be further configured to present location specific price or promotional offer associated with the item.

In various embodiments, the apparatus may further comprise a check-out module (e.g., the check-out processing module 520) that may be configured to allow a user, via the I/O unit, to purchase the item. In one embodiment, for example, the check-out module may perform payment functions such that the user may pay the price of the item, for example, to a corresponding vendor providing the item or a third party payment service (e.g., PayPal).

In various embodiments, the item detection module may be further configured to: select a first symbol as at least part of the notification based on determining that the item is identical to the previously identified item of interest; and select a second symbol as the at least part of the notification based on determining that the item is not identical to the previously identified item of interest.

In various embodiments, the item detection module (e.g., the item detection module 419) may be configured to: retrieve prior search history by the user for each item of interest within the list of items; perform the signaling for a corresponding one of items of interest within the list of items based on determining that a listing for the corresponding item of interest has been searched for or viewed by the user at least a pre-determined number of times; and refrain from performing the signaling for the corresponding item of interest based on determining that the listing for the corresponding item of interest has been searched for or viewed by the user less than the pre-determined number of times. In one embodiment, for example, the prior search history may be retrieved, for example, as a function of the search history managing module 525.

In various embodiments, the item detection module (e.g., the item location routing module 505) may provide (e.g., display or provide voice) map information showing and/or navigating a route from a current (e.g., indoor or outdoor) location of the user (e.g., the user device) to the item identified as being an item of interest. Such an item route map allows the user to easily find the item of interest positioned at a specific location (e.g., an aisle or a shelf) within or near a corresponding (physical) store. For example, the item location routing module 505 may determine that the user just entered a large home improvement store (e.g., the shopping mall 100) that sells one or more items previously searched for or added to a wish list. The mobile device may then present the user with a map of the store indicating (e.g., navigating) the exact (e.g., the aisle or shelf) location of the item. In such cases, for example, the user device may receive the map information for the store or the route information to the identified item in real time from a device (e.g., the on-site information transceiver 102) located within or near the store. In addition to or as an alternative to receiving the map or route information from the on-site device, in other embodiments, such information may be received from a server affiliated with the store or a third party (e.g., the item information source 130). Other embodiments may be possible.

Each of the modules described above with respect to FIGS. 4-5 may be implemented by hardware (e.g., circuit), firmware, software or any combinations thereof. Although each of the modules is described above as a separate module, all or some of the modules in FIGS. 4-5 may be implemented as a single entity (e.g., module or circuit) and still maintain the same functionality. Still further embodiments may be realized. Some of these may include a variety of methods. The system 400 and/or its component apparatus (e.g., 430 or 410) in FIGS. 3-4 may be used to implement, among other things, the processing associated with various methods of FIG. 6 discussed below.

Figure 6:
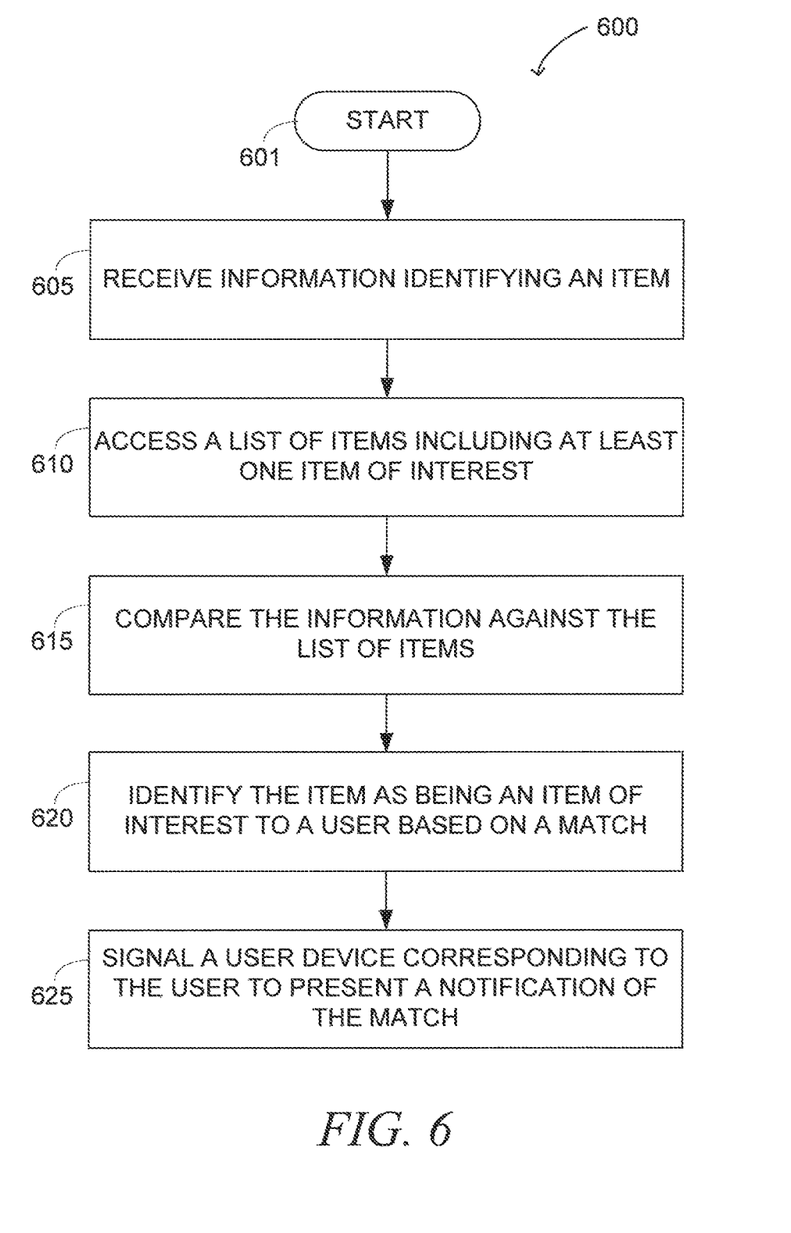
FIG. 6 is a flow diagram illustrating a method for detecting an item of interest using a user device, according to various embodiments.

FIG. 6 shows a flow diagram illustrating a method 600 for detecting an item of interest to a user of a client machine (e.g., the client machine 410), according to various embodiments. For example, in various embodiments, at least one portion of the method 600 may be performed by the item detection module 419 of FIG. 4, for example, when executed by the processor 417. The method 600 may commence at operation 601 and proceed to operation 605, where information identifying an item may be received at a user device (e.g., the client machine 410) corresponding to a user of a web service (e.g., the network-based publication system 432) in response to the user device being located within a specified range of distance from the item. In one embodiment, for example, the operation 605 may be performed as a function of the item information processing module 510.

At operation 610, a list of items may be accessed, for example, from the memory 415 of the client machine 410, wherein the list of items may include at least one item of interest to the user, and wherein each item of interest within the list of items may be previously identified (e.g., browsed) by the user at the web service. In one embodiment, for example, the operation 610 may be performed as a function of the item information processing module 510.

At operation 615, the information identifying the item may be compared against the list of items. In one embodiment, for example, the operation 615 may be performed as a function of the item information processing module 510.

At operation 620, the item may be identified (e.g., detected) as an item of interest to the user based at least in part on the information identifying the item also at least partially identifying the at least one item of interest within the list of items. In one embodiment, for example, the operation 620 may be performed as a function of the item information processing module 510.

At operation 625, the user device (e.g., the client machine 410) may be signaled to present a notification, for example, via its display unit (e.g., the display 411-1), alerting the user that the item at least partially matches a previously identified item of interest. In one embodiment, for example, the operation 625 may also be performed as a function of the I/O unit signaling module 515.

In various embodiments, a method may comprise: receiving, at a user device corresponding to a user of a web service, information identifying an item, based on the user device being located within a specified range of distance from the item; accessing a list of items, the list of items including at least one item of interest to the user, each item of interest within the list of items previously identified by the user at the web service; comparing, using one or more processors, the information against the list of items; identifying the item as being an item of interest to the user based at least in part on the information at least partially identifying the at least one item of interest within the list of items; and signaling the user device to present a notification alerting the user that the item at least partially matches a previously identified item of interest.

In various embodiments, the method may further comprise: identifying an item as a corresponding one of the at least one item of interest based at least in part on determining that the user has searched for or viewed a listing of the item, made a bid on the item, purchased the item, or read an article or news related to the item. In one embodiment, for example, the presenting the (alerting) notification to the user may be performed based on determining that the user searched for or viewed the item, made a bid on the item, purchased the item, or read an article or news related to the item at least a specified number of times (e.g., twice, five times and so on) within a specified time period (e.g., one week, two months, three years and so on). This allows reducing the number of incidents in which the user is annoyed by the (alerting) notification caused by items that have been previously browsed but have relatively low interest to the user. The user may be allowed to have an option to specify relevant configurations, such as the (threshold) number of times, the (threshold) time period and so on.

In various embodiments, the receiving may comprise capturing the information identifying the item as transmitted over-the-air from a merchant device located in proximity of the specified range of distance.

In various embodiments, the receiving may comprise capturing the information identifying the item using at least one of barcode, QR code, RFID, or GPS technologies.

In various embodiments, the receiving may comprise receiving the information identifying the item, across a network, from a first server corresponding to the web service providing listing of the at least one item of interest, or from a second server corresponding to a merchant providing the item.

In various embodiments, the signaling may comprise checking category information of the item; and refraining from performing the signaling based on determining that the category information matches one or more user-specified criteria.

In various embodiments, the signaling may comprise: checking category information of the item; selecting a first symbol as at least part of the notification based on determining that the category information matches a first one of specified categories; and selecting a second symbol as the at least part of the notification based on determining that the category information matches a second one of the specified categories.

In various embodiments, the signaling may comprise signaling the user device to present information identifying a location within a (e.g., physical) shop at which the item is displayed.

In various embodiments, the signaling may comprise signaling the user device to present information identifying one or more (e.g., physical) shops that provide the item. Other embodiments are possible.

The method 600 may be performed by processing logic that may comprise hardware (e.g., dedicated logic, programmable logic, microcode, etc.), such as at least one processor, software (such as run on a general purpose computing system or a dedicated machine), firmware, or any combination of these. It is noted that although the method 600 is explained above with respect to a user device, such as the client machine 410 including the item detection module 419 in FIG. 4, those skilled in the art will recognize that the method 600 may be performed by other systems and/or devices that provide substantially the same functionalities as the user device (e.g., the client machine 410).

Although only some activities are described with respect to FIG. 6, the method 600, according to various embodiments, may perform other activities, such as operations performed by the camera 413 and/or the server machine 430 (or the network-based publication system 432 therein) in FIG. 4, in addition to and/or as an alternative to the activities described with respect to FIG. 6.

The method 600 described herein does not have to be executed in the order described or in any particular order. Moreover, various activities described with respect to the method 600 identified herein may be executed in repetitive, serial, heuristic, parallel fashion or any combinations thereof. The individual activities of the method 600 shown in FIG. 6 may also be combined with each other and/or substituted, one for another, in various ways. Information, including parameters, commands, operands, and other data, may be sent and received between corresponding modules or elements in the form of one or more carrier waves. Thus, many other embodiments may be realized.

In various embodiments, the method 600 shown in FIG. 6 may be implemented in various devices, as well as in a machine-readable medium, such as a storage device, where the method 600 is adapted to be executed by one or more processors. Further details of such embodiments are described below with respect to FIG. 7.

Figure 7:
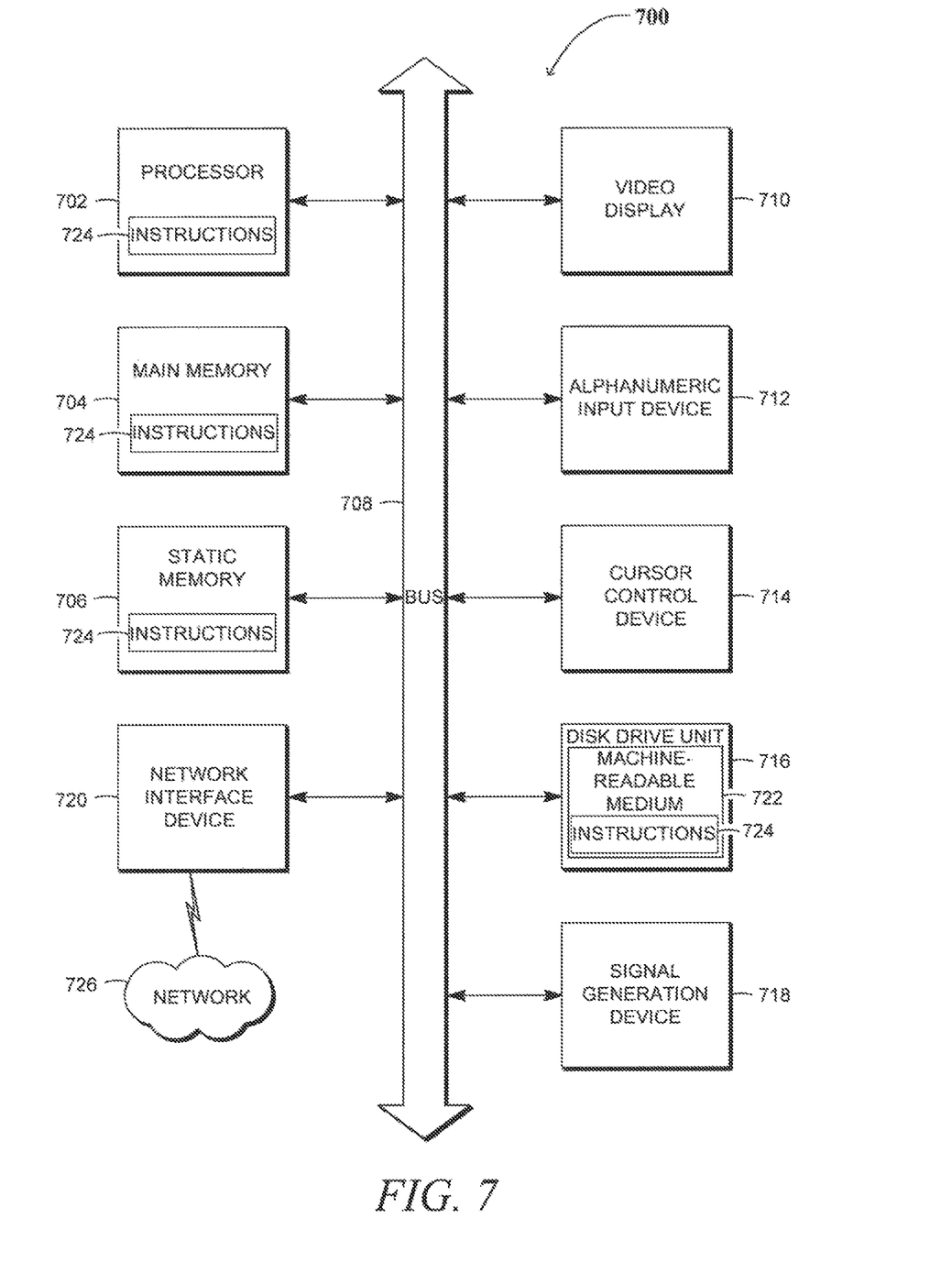
FIG. 7 is a diagrammatic representation of a machine in the example form of a computer system, according to various embodiments.

FIG. 7 is a diagrammatic representation of a machine (e.g., the client machine 410 or the server machine 430) in the example form of a computer system 700, according to various embodiments within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a user device in server-client network environment, or as a peer machine in a peer-to-peer (or distributed) network environment. The machine may be a server computer, a client computer, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700, comprising an article of manufacture, may include a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker or an antenna) and a network interface device 720.

The disk drive unit 716 may include a machine-readable medium 722 on which is stored one or more sets of instructions 724 (e.g., software) embodying any one or more of the methodologies or functions described herein. The instructions 724 may also reside, completely or at least partially, within the main memory 704, static memory 706, and/or within the processor 702 during execution thereof by the computer system 700, with the main memory 704, static memory 706 and the processor 702 also constituting machine-readable media. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium, such as a storage device, that is capable of storing, encoding or carrying a set of instructions for execution by the machine and that cause the machine to perform any one or more of the methodologies according to various embodiments. The term "machine-readable medium" shall accordingly be taken to include, but not be limited to, solid-state memories, optical media, and magnetic media.

Thus, method and system for identifying an item of interest to a user are disclosed herein. Although described with reference to specific example embodiments, it will be evident that various modifications and changes may be made to these embodiments without departing from the broader spirit and scope thereof. The various modules and/or engines described herein may be implemented in hardware, software, or a combination of these. Accordingly, the specification and drawings are to be regarded in an illustrative rather than a restrictive sense.

According to various embodiments, existence of an item identical, similar or related to an item of interest that has been previously identified (e.g., browsed, searched for, purchased, made a bid on, or rented) online, may be identified within or near a physical facility (e.g., the shopping mall 100) using a user device, such as a smartphone. In addition, location information of the physical facility, or specific (e.g., shelf) location information within or near the physical facility where the item can be found, may be provided. Additional information, such as price comparisons or sale periods, for the (identified) item, the (previously browsed) item of interest or other items related to the item of interest may be presented. This allows a user of the user device to maximize the (accidental or intended) visit to the physical facility, reducing the time needed to find a specific location within the physical facility or the need to visit the physical facility again for forgotten items that have been previously browsed. Higher frequency of use and/or enhanced user experiences with respect to the user device may result.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
 a memory; and
 at least one hardware processor coupled to the memory and comprising instructions that causes the system to perform operations comprising:

accessing, at a client device, a browsing history that includes an item listing searched at a first merchant, the item listing comprising an identification of an item of interest;
generating an item list associated with a user of the client device based on the item listing from the browsing history;
receiving location data that identifies a current location of the client device from a beacon of a position location system located within a physical store associated with a second merchant separate from the first merchant, the position location system comprising a plurality of beacons, the beacon having a beacon identifier that identifies the beacon among the plurality of beacons, the beacon identifier providing an indication of the current location of the client device;
retrieving inventory information of the physical store from an inventory information provider in response to the receiving the location data that identifies the current location of the client device from the position location system, the inventory information including item data that identifies locations of items within the physical store;
identifying the item of interest within the inventory information of the physical store;
determining a location of the item of interest within the physical store based on the location data of the inventory information in response to the identifying the item of interest within the inventory information of the physical store;
determining from the browsing history that the item of interest has been searched at least a specified number of times by the user within a specified period of time; and
causing display of a notification at the client device in response to the determining the location of the item of interest within the physical store and that the user has searched for the item of interest the specified number of times within the specified period of time, the notification comprising a presentation of the item listing that includes the identification of the item of interest, a display of the location of the item of interest within the physical store, and a display of a price associated with the item of interest.

2. The system of claim 1, further comprising: memory to store at least one personal data store including the item list, each item of interest within the item list provided by a web service upon a listing of a corresponding item of interest being browsed via the web service, wherein the personal data store is received from a server hosting at least a portion of the web service.

3. The system of claim 1, wherein the causing display of the notification at the client device further comprises causing the client device to emit an auditory alert.

4. The system of claim 1, wherein the instructions cause the system to perform operations further comprising:
presenting a location specific price or promotional offer associated with the item of interest.

5. The system of claim 1, wherein the notification further includes promotional information, a price comparison, and a sale period.

6. The system of claim 1, wherein the instructions cause the system to perform operations further comprising:
refraining from causing display of the notification for the item of interest based on determining that the item of interest has been searched by the user less than a requisite number of times.

7. A method comprising:
accessing, at a client device, a browsing history that includes an item listing searched at a first merchant, the item listing comprising an identification of an item of interest;
generating an item list associated with a user of the client device based on the browsing history that includes the item listing;
receiving location data that identifies a current location of the client device from a beacon of a position location system located within a physical store associated with a second merchant separate from the first merchant, the position location system comprising a plurality of beacons, the beacon having a beacon identifier that identifies the beacon among the plurality of beacons, the beacon identifier providing an indication of the current location of the client device;
retrieving inventory information of the physical store from an inventory information provider in response to the receiving the location data that identifies the current location of the client device from the position location system, the inventory information including item data that identifies locations of items within the physical store;
identifying the item of interest within the inventory information of the physical store;
determining a location of the item of interest within the physical store based on the location data of the inventory information in response to the identifying the item of interest within the inventory information of the physical store;
determining from the browsing history that the item of interest has been searched at least a specified number of times by the user within a specified period of time; and
causing display of a notification at the client device in response to the determining the location of the item of interest within the physical store and that the user has searched for the item of interest the specified number of times within the specified period of time, the notification comprising a presentation of the item listing that includes the identification of the item of interest, a display of the location of the item of interest within the physical store, and a display of a price associated with the item of interest.

8. The method of claim 7, wherein the determining the current location further comprises:
capturing information as transmitted over-the-air from a merchant device located in proximity of a specified range of distance of the user device.

9. The method of claim 7, wherein the causing display of the notification further comprises:
checking category information of the item of interest;
selecting a graphical element based on the category information of the item of interest; and
wherein the notification includes a display of the graphical element.

10. A non-transitory machine-readable storage device storing instructions that, when executed by one or more processors, cause the one or more processors to perform operations comprising:
accessing, at a client device, a browsing history that includes an item listing searched at first merchant, the item listing comprising an identification of an item of interest;
generating an item list associated with a user of the client device based on the browsing history that includes the item listing;

receiving location data that identifies a current location of the client device from a beacon of a position location system located within a physical store associated with a second merchant separate from the first merchant, the position location system comprising a plurality of beacons, the beacon having a beacon identifier that identifies the beacon among the plurality of beacons, the beacon identifier providing an indication of the current location of the client device;

retrieving inventory information of the physical store from an inventory information provider in response to the receiving the location data that identifies the current location of the client device from the position location system, the inventory information including item data that identifies locations of items within the physical store;

identifying the item of interest within the inventory information of the physical store;

determining a location of the item of interest within the physical store based on the location data of the inventory information in response to the identifying the item of interest within the inventory information of the physical store;

determining from the browsing history that the item of interest has been searched at least a specified number of times by the user within a specified period of time; and causing display of a notification at the client device in response to the determining the location of the item of interest within the physical store and that the user has searched for the item of interest the specified number of times within the specified period of time, the notification comprising a presentation of the item listing that includes the identification of the item of interest, a display of the location of the item of interest within the physical store, and a display of a price associated with the item of interest.

* * * * *